(12) United States Patent
Lee et al.

(10) Patent No.: US 9,037,063 B2
(45) Date of Patent: May 19, 2015

(54) METHOD OF FORMING THIN RESISTIVE HEATING LAYER, HEATING MEMBER INCLUDING THE THIN RESISTIVE HEATING LAYER, AND FUSING UNIT INCLUDING THE HEATING MEMBER

(71) Applicant: Samsung Electronics Co., Ltd., Suwon-Si, Gyeonggi-Do (KR)

(72) Inventors: Sang-eui Lee, Hwaseong-si (KR); Ha-jin Kim, Hwaseong-si (KR); Dong-earn Kim, Seoul (KR); Dong-ouk Kim, Pyeongtaek-si (KR); Sung-hoon Park, Seoul (KR); Min-jong Bae, Yongin-si (KR); Yoon-chul Son, Hwaseong-si (KR); Kun-mo Chu, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 14 days.

(21) Appl. No.: 13/930,624

(22) Filed: Jun. 28, 2013

(65) Prior Publication Data
US 2014/0053393 A1 Feb. 27, 2014

(30) Foreign Application Priority Data
Aug. 22, 2012 (KR) ........................ 10-2012-0091988

(51) Int. Cl.
*G03G 15/20* (2006.01)
*H01C 17/02* (2006.01)
*H01C 17/06* (2006.01)
(Continued)

(52) U.S. Cl.
CPC ........... *G03G 15/2057* (2013.01); *H01C 17/02*
(2013.01); *H01C 17/06* (2013.01); *H05B 3/46*
(2013.01); *H05B 3/145* (2013.01); *B82Y 30/00*
(2013.01); *H01C 17/0652* (2013.01); *H01C 17/06586* (2013.01); *H05B 3/0095* (2013.01);
*H05B 2203/013* (2013.01); *H05B 2214/04*
(2013.01)

(58) Field of Classification Search
USPC ........................................... 399/333; 219/216
See application file for complete search history.

(56) References Cited

U.S. PATENT DOCUMENTS 4,145,385 A * 3/1979 Sako et al. .................... 264/469
4,177,376 A * 12/1979 Horsma et al. ................ 219/553
(Continued)

FOREIGN PATENT DOCUMENTS

JP 2009109998 A 5/2009
JP 2009211003 A 9/2009

OTHER PUBLICATIONS

Shofner, M.L., et al, "Nanofiber-Reinforced Polymers Prepared by Fused Deposition Modeling", Journal of Applied Polmer Science, (2003), pp. 3081-3090, vol. 89.
(Continued)

*Primary Examiner* — G. M. Hyder
(74) *Attorney, Agent, or Firm* — Harness, Dickey & Pierce, P.L.C.

(57) ABSTRACT

A method of forming a thin film resistive heating layer, the method including: forming a polymer layer by extruding a polymer paste, in which an electrically conductive filler is dispersed, by using an extrusion molding operation, on an outer circumferential surface of a cylindrical member; and forming a thin film resistive heating layer by making an outer diameter of the polymer layer uniform by using a ring blading operation.

20 Claims, 9 Drawing Sheets

(51) Int. Cl.
  *H05B 3/46* (2006.01)
  *H05B 3/14* (2006.01)
  *H05B 3/00* (2006.01)
  *B82Y 30/00* (2011.01)
  *H01C 17/065* (2006.01)

(56) References Cited

U.S. PATENT DOCUMENTS

| | | | | |
|---|---|---|---|---|
| 4,820,904 | A | * | 4/1989 | Urban ............................ 219/216 |
| 5,837,340 | A | * | 11/1998 | Law et al. .................... 428/36.8 |
| 5,866,194 | A | * | 2/1999 | Ogawa et al. ..................... 427/8 |
| 5,945,020 | A | * | 8/1999 | Kuroda et al. ................ 219/543 |
| 2001/0024582 | A1 | * | 9/2001 | Hwang ......................... 399/333 |
| 2010/0190100 | A1 | | 7/2010 | Kelly et al. |
| 2011/0133133 | A1 | | 6/2011 | Fischer et al. |
| 2011/0300368 | A1 | | 12/2011 | Qi et al. |
| 2013/0251425 | A1 | * | 9/2013 | Son et al. ...................... 399/331 |
| 2013/0302074 | A1 | * | 11/2013 | Lee et al. ...................... 399/333 |
| 2014/0126940 | A1 | * | 5/2014 | Son et al. ...................... 399/333 |
| 2014/0294471 | A1 | * | 10/2014 | Lee et al. ...................... 399/333 |

OTHER PUBLICATIONS

Zhou, et al, "Physical and Chemical Mechanism of Mechanical Mixing of Powder Styrene-butadiene Rubber Composites Filled with High Contents of Carbon Nantubes", Chemical Journal of Chinese Universities, (Mar. 2009), pp. 601-606, vol. 30 No. 3.

* cited by examiner

METHOD OF FORMING THIN RESISTIVE HEATING LAYER, HEATING MEMBER INCLUDING THE THIN RESISTIVE HEATING LAYER, AND FUSING UNIT INCLUDING THE HEATING MEMBER

CROSS-REFERENCE TO RELATED APPLICATIONS

This application claims priority to Korean Patent Application No. 10-2012-0091988, filed on Aug. 22, 2012, and all the benefits accruing therefrom under 35 U.S.C. §119, the content of which in its entirety is herein incorporated by reference.

BACKGROUND

1. Field

The disclosure relates to methods of forming a thin film resistive heating layer, a heating member including the thin film resistive heating layer, a fusing unit including the heating member.

2. Description of the Related Art

An electro-photographic image forming apparatus may form a visible toner image on an image receptor by supplying toner to an electrostatic latent image formed on the image receptor, transfer the toner image onto a recording medium, and fuse the transferred toner image on the recording medium. Toner is typically prepared by adding various functional additives including a coloring, to a base resin. A fusing operation typically includes an operation of applying heat and pressure to the toner. A considerable amount of energy consumed by the electro-photographic image forming apparatus is used during a fusing operation.

In general, a fusing unit includes a heating roller and a pressurizing roller that are engaged with each other to form a fusing nip. The heating roller is heated by using a heat source such as a halogen lamp. Heat and pressure are applied to toner while a recording medium, on which the toner is transferred, passes through the fusing nip. In the fusing unit, the heat source heats the heating roller, and the heat is typically passes through the recording medium to be transferred to the toner.

SUMMARY

Provided are methods of forming a thin film resistive heating layer having a substantially uniform thickness using an electroconductive polymer paste.

Provided are heating members including the thin film resistive heating layers, and fusing units including the heating members.

Additional aspects will be set forth in part in the description which follows and, in part, will be apparent from the description, or may be learned by practice of the presented embodiments.

According to an embodiment of the invention, a method of thin film resistive heating layer includes: providing a polymer layer by extruding a polymer paste, in which an electroconductive filler is dispersed, using an extrusion molding operation on an outer circumferential surface of a cylindrical member; and providing a thin film resistive heating layer using a ring blading operation such that an outer diameter of the polymer layer is substantially uniform.

In an embodiment, the thin film resistive heating layer may be in a range of about 100 micrometers (μm) to about 500 micrometers (μm) thick.

In an embodiment, the polymer layer may have a thickness of about 1 millimeter (mm) or less.

In an embodiment, a thickness deviation of the thin film resistive heating layer in a circumferential direction may be about 30 μm or less.

In an embodiment, a thickness deviation of the thin film resistive heating layer in an axial direction may be about 30 μm or less.

In an embodiment, viscosity of the polymer paste at a shearing speed of 100 times per second (/s) may be about 500 Pascal second (Pa·s) or more.

In an embodiment, electrical conductivity of the thin film resistive heating layer may be about 100 siemens per meter (S/m) or higher.

In an embodiment, the electroconductive filler may include carbon nanotubes of about 5 parts by weight or more.

In an embodiment, a length of the carbon nanotubes may be 1 μm or more.

In an embodiment, mean roughness depth of the thin film resistive heating layer may be about 20 μm or less.

In an embodiment, surface gloss of the thin film resistive heating layer may be about 5.0 gloss unit (GU) or more.

In an embodiment, the method may further include hardening the thin film resistive heating layer.

According to another embodiment of the invention, a heating member includes: a cylindrical member; and a thin film resistive heating layer disposed on an outer circumferential surface of the cylindrical member, where the tin film resistive heating layer includes a polymer layer, and an electroconductive filler disposed in the polymer layer.

In an embodiment, the electroconductive filler may include carbon nanotubes of about 5 parts by weight or more.

In an embodiment, a length of the carbon nanotubes may be 1 μm or more.

In an embodiment, mean roughness depth of the thin film resistive heating layer may be about 20 μm or less.

In an embodiment, surface gloss of the thin film resistive heating layer may be about 5.0 gloss unit (GU) or more.

In an embodiment, thickness deviation of the thin film resistive heating layer in a circumferential direction may be about 30 μm or less.

In an embodiment, thickness deviation of the thin film resistive heating layer in an axial direction may be about 30 μm or less.

According to another embodiment of the invention, a fusing unit includes: the heating member described above; and a pressurizing member disposed opposite to the heating member, where the heating member and the pressurizing member define a fusing nip which pressurizes and transports a recording medium.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
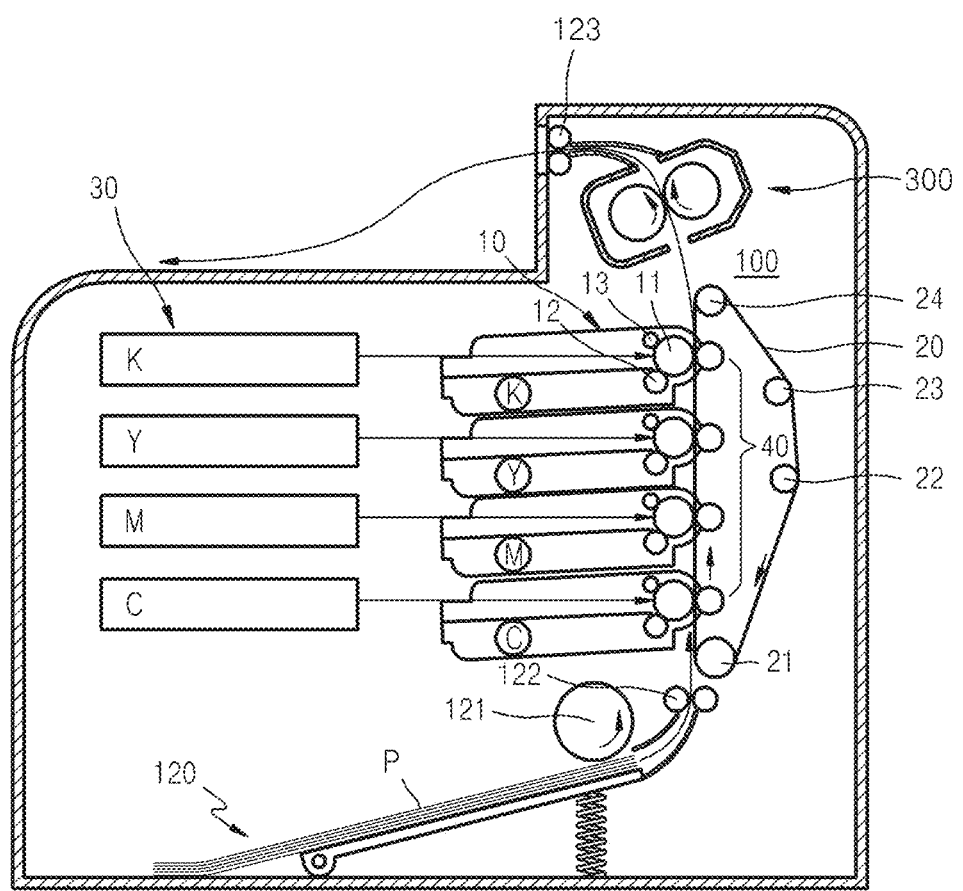
FIG. 1 is a schematic cross-sectional view of an embodiment of an electro-photographic image forming apparatus according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments according to the invention will be described in further detail with reference to the accompanying drawings.

FIG. 1 is a schematic cross-sectional view of an embodiment of an electro-photographic image forming apparatus according to the invention. Referring to FIG. 1, the image forming apparatus includes a printing unit 100 that form a toner image on a recording medium by an electro-photographic process, and a fusing unit 300. In an embodiment, as shown in FIG. 1, the image forming apparatus may be a dry type electro-photographic image forming apparatus that prints a color image using a dry development material (hereinafter referred to as toner).

In an embodiment, for example, the printing unit 100 may include an exposure unit 30, a developing unit 10 and a transfer unit. In an embodiment, the printing unit 100 includes a plurality of developing units 10, e.g., four developing units 10C, 10M, 10Y and 10K, including different color toners such as cyan ("C"), magenta ("M"), yellow ("Y"), and black ("K"), for example, and a plurality of exposure units 30, e.g., four exposure units 30C, 30M, 30Y and 30K, corresponding to the developing units 10C, 10M, 10Y, and 10K, respectively.

Each of the developing units 10C, 10M, 10Y and 10K includes a photosensitive drum 11 which is an image receptor, on which an electrostatic latent image is formed, and a developing roller 12 that develops the electrostatic latent image. Each of the developing units 10C, 10M, 10Y and 10K may further include a charge roller 13, and a charge bias voltage is applied to the charge roller 13 to charge an outer circumference of the photosensitive drum 11 with a uniform electric potential. In an alternative embodiment, each of the developing units 10C, 10M, 10Y and 10K may include a corona discharger (not shown) instead of the charge roller 13. Toner is attached onto an outer circumference of the developing roller 12 to supply the toner to the photosensitive drum 11. A developing bias voltage for supplying toner to the photosensitive drums 11 is applied to the developing roller 12. In an embodiment, each of the developing units 10C, 10M, 10Y, and 10K may further include a supply roller (not shown) that attaches the toner contained in the corresponding developing units 10C, 10M, 10Y, and 10K to the developing roller 12, a regulating unit (not shown) that regulates the amount of toner attached to the developing roller 12, and an agitator (not shown) that transfers the toner contained in the corresponding developing units 10C, 10M, 10Y and 10K to the supply roller and/or to the developing roller 12. Each of the developing units 10C, 10M, 10Y and 10K may include a cleaning blade (not shown) that removes the toner from the outer circumference of the photosensitive drum 11 before charging the photosensitive drum 11, and a receiving space (not shown) configured to contain the removed toner.

In one embodiment, for example, the transfer unit may include a recording medium conveyor belt 20 and a plurality of transfer rollers 40, e.g., four transfer rollers 40. The recording medium conveyor belt 20 is disposed opposite to, e.g., facing, an outer circumferential surface of the photosensitive drums 11 of the developing units 10C, 10M, 10Y and 10K that are exposed to the outside of the developing units 10C, 10M, 10Y and 10K. The recording medium conveyor belt 20 is supported by a plurality of supporting rollers 21, 22, 23 and 24 and circulates. In an embodiment, as shown in FIG. 1, the recording medium conveyor belt 20 may be installed substantially in a vertical direction. Each of the transfer rollers 40 is disposed opposite to, e.g., facing, a corresponding photosensitive drum 11 of the respective developing units 10C, 10M, 10Y and 10K with the recording medium conveyor belt 20 interposed therebetween. A transfer bias voltage is applied to the transfer rollers 40. Each of the exposure units 30C, 30M, 30Y and 30K scans light corresponding to information of C, M, Y, and K images onto the corresponding photosensitive drum 11 of the developing units 10C, 10M, 10Y and 10K. In an embodiment, a laser scanning unit ("LSU"), which uses a laser diode as a light source, may be used as the exposure units 30C, 30M, 30Y and 30K.

Hereinafter, an embodiment of a method of forming a color image according to the invention will be described.

The photosensitive drums 11 of the developing units 10C, 10M, 10Y and 10K are charged with a uniform electric potential by a charging bias voltage applied to the charging roller 13. Each of the exposure units 30C, 30M, 30Y and 30K may scan light corresponding to information of one of C, M, Y and K images onto the corresponding photosensitive drum 11 of the developing units 10C, 10M, 10Y and 10K to produce an electrostatic latent image. A developing bias voltage is applied to the developing roller 12. Then, the toner on the outer circumference of the developing roller 12 is adhered onto the electrostatic latent image such that C, M, Y and K toner images are provided on the corresponding photosensitive drum 11 of the developing units 10C, 10M, 10Y and 10K.

A medium that finally accommodates toner, such as a recording medium P, is provided, e.g., fed, from a cassette 120 by a pickup roller 121. The recording medium P may be directed toward the recording medium conveyor belt 20 via a feed roller 122. The recording medium P may be adhered to a surface of the recording medium conveyor belt 20 by an electrostatic force and be fed at a speed that is substantially the same as the moving speed of the recording medium conveyor belt 20.

In one embodiment, for example, a front end of the recording medium P may arrive at a transfer nip when a front end of the C toner image formed on the outer circumferential surface of the photosensitive drum 11 of the developing unit 10C arrives at the transfer nip facing the transfer roller 40. When a transfer bias voltage is applied to the transfer roller 40, the C toner image formed on the photosensitive drum 11 is transferred to the recording medium P. As the recording medium P is transported, each of the remaining M, Y and K toner images formed on the corresponding photosensitive drum 11 of the remaining developing units 10M, 10Y and 10K may be sequentially transferred to the recording medium P by overlapping the toner images each other on the recording medium P, and form a color toner image on the recording medium P.

The color toner image transferred to the recording medium P may be retained on a surface of the recording medium P by an electrostatic force. The fusing unit 300 fuses the color toner image to the recording medium P by applying heat and pressure thereto. The recording medium P, when fusing is completed, may be discharged to a space outside of the image forming apparatus via a discharging roller 123.

In an embodiment, the fusing unit 300 may be heated to a temperature close to a predetermined fusing temperature to form an image. The shorter the time for heating, the quicker the first page is printed once a print command is received. The fusing unit 300 is heated only when printing is conducted and may not operate in a standby mode. In this case, when printing restarts, it takes time to repeatedly heat the fusing unit 300. The fusing unit 300 may be controlled in a manner that a predetermined temperature is maintained in a standby mode to shorten the time for restart of the printing. In a standby mode, a preheating temperature may be about 120° C. to about 180° C. When the time for raising a temperature of the fusing unit 300 to a printing temperature is substantially reduced, preheating in a standby mode may be omitted, and thus power consumed in the fusing unit 300 may be substantially reduced.

Figure 2:
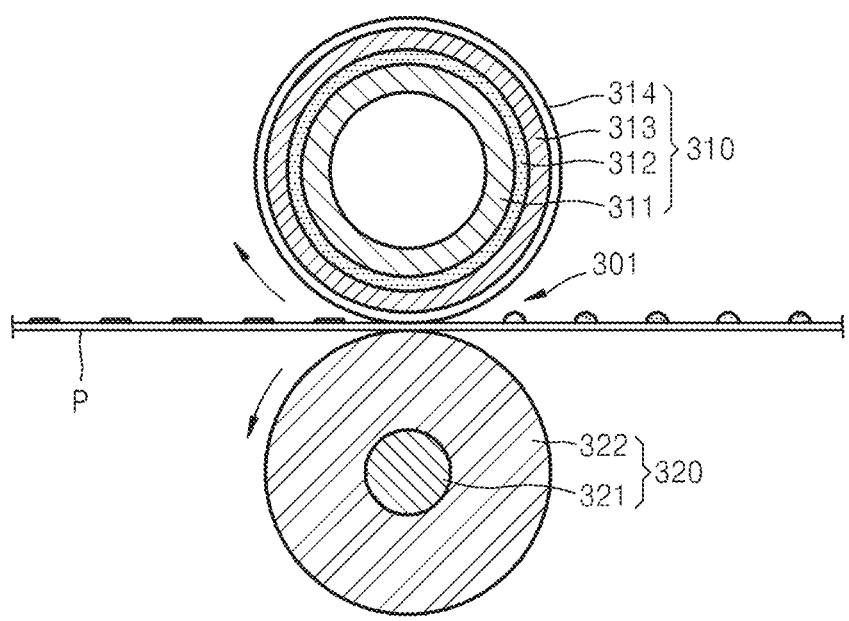
FIG. 2 is a schematic cross-sectional view of an embodiment of a roller type fusing unit according to the invention.
Figure 3:
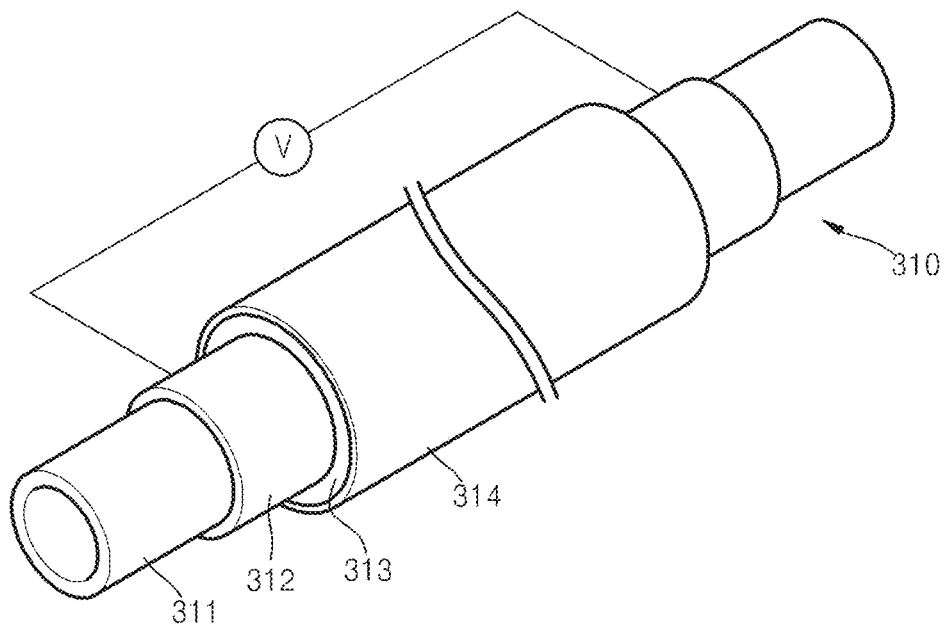
FIG. 3 is a perspective view of an embodiment of a heating member applied to the fusing unit illustrated in FIG. 2 according to the invention.

FIG. 2 is a schematic cross-sectional view of an embodiment of a fusing unit 300 according to the invention. FIG. 3 is a perspective view of an embodiment of a heating member 310 in the fusing unit 300 illustrated in FIG. 2 according the invention. In an embodiment, as shown in FIG. 2, the fusing unit 300 may be a roller type fusing unit that includes a roller type heating member.

Referring to FIGS. 2 and 3, the fusing unit 300 includes the heating member 310, which is a roller type, and a pressurizing member 320 that faces the heating member 310 and defines a fusing nip 301 with the heating member 310. The pressurizing member 320 faces the heating member 310 and thereby defines the fusing nip 301. In one embodiment, for example, the pressurizing member 320 is a roller type including a metal member 321 and an elastic layer 322. The heating member 310 and the pressurizing member 320 are biased in a direction in which they are engaged with each other via a bias unit (not shown) such as a spring, for example. As a portion of the elastic layer 322 of the pressurizing member 320 is deformed, the fusing nip 301 is defined, through which heat is transferred from the heating member 310 to toner on the recording medium P.

In an embodiment, the fusing unit 300 substantially rapidly rises temperature of the heating member 310 by including a thin film layer for heating in the heating member 310. The heating member 310 may include a resistive heating layer 312 and a member 311 that supports the resistive heating layer 312. In an embodiment, as shown in FIG. 2, the member 311 that supports the resistive heating layer 312 has a hollow pipe form, the heating member 310 has a roller form. The heating member 310 having the roller form and applied to a fusing unit of an electro-photographic image forming apparatus is typically referred to as a fusing roller.

Figure 4:
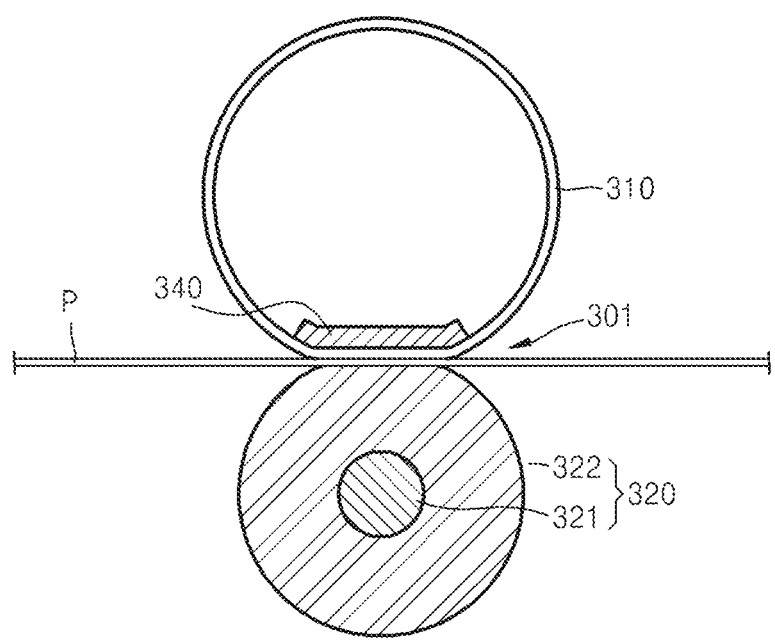
FIG. 4 is a schematic cross-sectional view of an embodiment of a belt-type fusing unit according to the invention.

FIG. 4 is a cross-sectional view of another embodiment of a fusing unit 300 according to the invention. In an alternative embodiment, as shown in FIG. 4, the fusing unit 300 may include a heating member 310 including a belt-type member 311. When an embodiment of the heating member 310 includes the heating member including the belt-type member 311, the heating member 310 is typically referred to as a fusing belt. Referring to FIG. 4, the heating member 310, a pressurizing member 320 and a nip forming member 340 are illustrated. The nip forming member 340 is disposed within the belt-type heating member 310 which forms a closed loop. The pressurizing member 320 is disposed outside the fusing member 310. To form a fusing nip 301, the nip forming member 340 and the pressurizing member 320 rotate while being engaged with each other and the heating member 310 is disposed therebetween. A bias unit (not shown) applies an elastic force to the nip forming member 340 and/or the pressurizing member 320 in a direction in which the nip forming member 340 and the pressurizing member 320 are engaged with each other. In one embodiment, for example, the nip forming member 340 may be pressurized toward the pressurizing member 320. In an alternative embodiment, the nip forming member 340 may be in an elastic roller form and may be rotated together with the pressurizing member 320 to thereby circulate the heating member 310.

Figure 5:
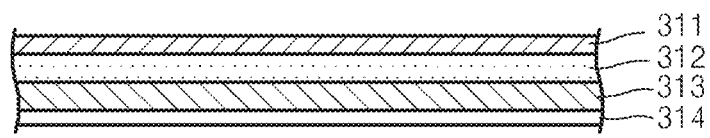
FIG. 5 is a partial cross-sectional view of an embodiment of a heating member of the fusing unit illustrated in FIG. 4 according to the invention.

FIG. 5 is a cross-sectional view of an embodiment of a heating member 310 of the fusing unit according to the invention. The heating member 310 may include, as illustrated in FIGS. 2 and 5, a member 311 and a resistive heating layer 312 disposed outside the member 311. In the heating member 310 of a roller type illustrated in FIG. 2, the member 311 may be a rigid body having sufficient rigidity. In the heating member 310 of FIG. 4, which is a belt type, the member 311 has such flexibility that the heating member 310 may flexibly deform at the fusing nip 301 and return to its original state once deviated from the fusing nip 301, may be selected.

In an embodiment, the resistive heating layer 312 may be provided, e.g., formed, by, for example, extruding a polymer paste, in which an electroconductive filler is dispersed, onto an outer circumferential surface of the member 311.

In an embodiment, the member 311 may include a material, e.g., polymer materials such as polyimide, polyimideamide and fluoropolymers, or a metallic material. In such an embodiment, the fluoropolymers include fluorinated polyetheretherketones ("PEEK"), polytetrafluoroethylenes ("PTFE"), perfluoroalkoxy ("PFA"), and fluorinated ethylene prophylene ("FEP"), for example. In such an embodiment, the metallic material includes stainless steel, nickel, copper and brass, for example. In an embodiment, where the member 311 includes a metallic material, which is conductive, the member 311 may include a metallic core and an electrical insulating layer on an outer circumference of the metallic core.

In an embodiment, where the resistive heating layer 312 includes the polymer paste, a base polymer of the polymer paste may include any material that has thermal resistance to a fusing temperature. In one embodiment, for example, a base polymer may be a high thermal resistive polymer such as silicone polymer, polyimide, polyimideamide or fluoropolymer. In such an embodiment, the fluoropolymer include PTFE, fluorinated PEEK, PFA, and FEP, for example. The resistive heating layer 312 may be elastic. Hardness of the base polymer may be adjusted based on elasticity of the resistive heating layer 312. The base polymer may include at least one of the above-described polymers. In an embodiment, the base polymer may be a blend or a copolymer of at least two of the above-described polymers.

In an embodiment, one type of electroconductive filler or at least two types of electroconductive fillers may be dispersed in a base polymer. In an embodiment, the electroconductive filler may include a metallic filler such as metallic particles and carbonaceous filler. In such an embodiment, the carbonaceous filler may include carbon nanotubes ("CNT"), carbon black, carbon nanofibers, graphene, expanded graphite, graphite nanoplatelets and graphite oxide ("GO"), for example.

In an embodiment, an electroconductive filler is dispersed in the base polymer and thereby forms an electroconductive network. In such an embodiment, a conductor or resistor having a predetermined electroconductivity may be provided based on the content of the electroconductive filler. CNTs typically have conductivity that is close to conductivity of a metal with a substantially low density, and thus heat capacity of CNTs per unit volume (heat capacity=density×specific heat) is lower by three to four times than heat capacity of typical resistant materials. Accordingly, in an embodiment, the temperature of the resistive heating layer 312 including CNTs as a conductive filler may quickly change. In such an embodiment, where the heating member 310 includes the resistive heating layer 312 including the electroconductive filler, a time for converting a standby mode to a printing mode may be substantially shortened, and accordingly, a fast first printing operation may be conducted. In such an embodiment, preheating the heating member 310 in the standby mode may be omitted, and thus, power consumption is substantially reduced.

In an embodiment where the electroconductive filler includes a carbonaceous filler, e.g., CNTs, the content of the carbonaceous filler may be about 5 parts by weight or more. When the content of the carbonaceous filler is less than about 5 parts by weight, an electroconductive network may not be effectively provided. The higher the content of the carbonaceous filler in the resistive heating layer 312, the higher the electroconductivity, but stiffness of the resistive heating layer 312 may substantially increase. In an embodiment, where the resistive heating layer 312 defines a fusing nip 301 together with the pressurizing member 320, when stiffness of the resistive heating layer 312 is too high, a fusing nip 301 having an appropriate size may not be effectively provided. In such an embodiment, high stiffness degrades mechanical properties of the resistive heating layer 312, which may shorten the lifespan of the heating member 310. Accordingly, in an embodiment, the content of the carbonaceous filler may be about 50 parts by weight or less. In an embodiment, electro-conductivity of the resistive heating layer 312 may be about 100 siemens per meter (S/m) to quickly rise the temperature thereof, but not being limited thereto. In an embodiment, metal oxide particles such as $Fe_2O_3$ or $Al_2O_3$, for example, may be included in the resistive heating layer 312 such that thermal resistance of the resistive heating layer 312 may be increased. In such an embodiment, the content of the metal oxide particles may be, for example, about 5 parts by weight or less. In an embodiment, the resistive heating layer 312 may have a thickness in a range of about 100 micrometers (μm) to about 500 micrometers (μm) such that the temperature is raised substantially rapidly by reducing the heat capacity of the resistive heating layer 312.

A polymer paste, in which an electroconductive filler of about 5 parts by weight or more is dispersed, may have a viscosity of about 500 Pascal second (Pa·s) in an extrusion molding operation at a shear rate of about 100 inverse seconds (/s), and a film resistive heating layer 312 having a predetermined thickness may not be effectively formed in the extrusion molding operation due to high viscosity. According to experiments, when extruding a polymer paste to a thickness of about 700 μm at a shear rate of about 100/s and a viscosity of about 500 Pa·s, a thickness deviation of about 100 μm or more occurred, and when extruding a polymer paste to a thickness of about 500 μm, a thickness deviation of about 200 μm or more occurred or an extrusion molding may not be effectively preformed.

When the polymer paste has a viscosity of about 500 Pa·s, a resistive heating layer 312 that is thicker than a predetermined thickness may be formed on an outer circumferential surface of the member 311 using an extrusion molding operation, and then after a hardening operation, the resistive heating layer 312 may be grinded to have the predetermined outer diameter. However, in a grinding operation after a hardening operation, the electroconductive network formed in the polymer may be damaged by the electroconductive filler due to heat. In addition, surface roughness of the resistive heating layer 312 after a grinding operation may increase, such that adhesive properties may be impaired in a case when a new polymer layer is to be formed on an outer circumferential surface of the resistive heating layer 312. In addition, due to material loss during the grinding operation, the material costs may increase.

Figure 6:
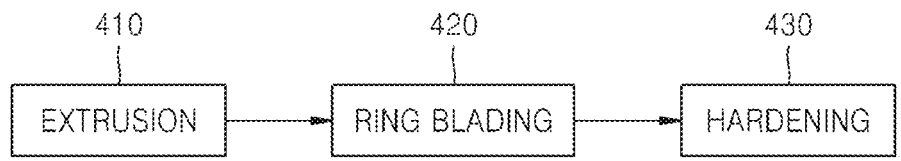
FIG. 6 is a block diagram illustrating an embodiment of a method of forming a thin film resistive heating layer according to the invention.

FIG. 6 is a block diagram illustrating an embodiment of a method of forming a thin film resistive heating layer according to the invention. In an embodiment of the method of forming a resistive heating layer according to the invention, as illustrated in FIG. 6, after an extrusion molding operation 410, the thickness of the resistive heating layer 312 is uniformized using a ring blading operation 420, and then a hardening operation 430 is conducted to provide the thin film resistive heating layer 312 having a predetermined thickness on the outer circumference of the member 311. Hereinafter, an embodiment of the method of forming a thin film resistive heating layer 312 the invention will be described in greater detail with reference to FIGS. 7 to 11.

Figure 7:
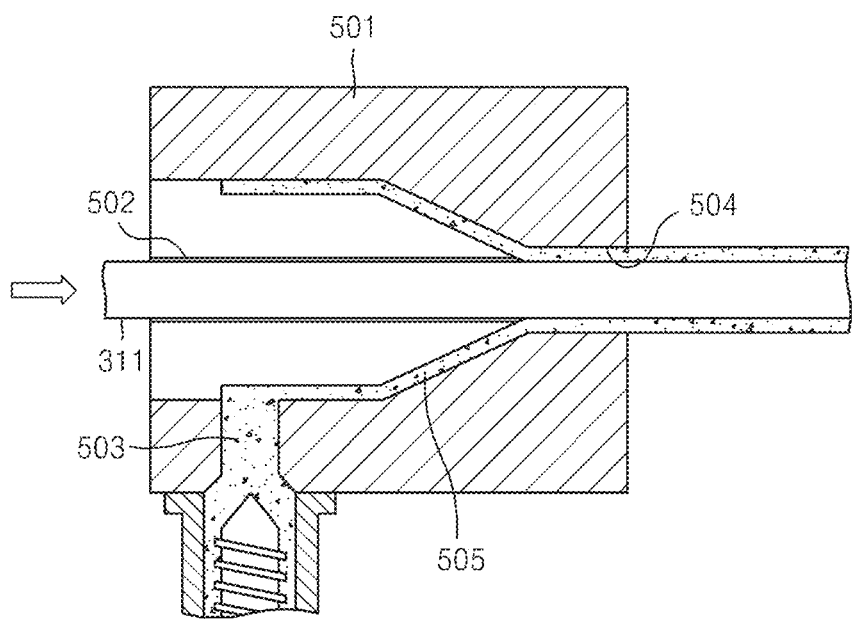
FIG. 7 is a schematic cross-sectional view of a molding die showing an embodiment of an extrusion molding operation according to the invention.
Figure 8:
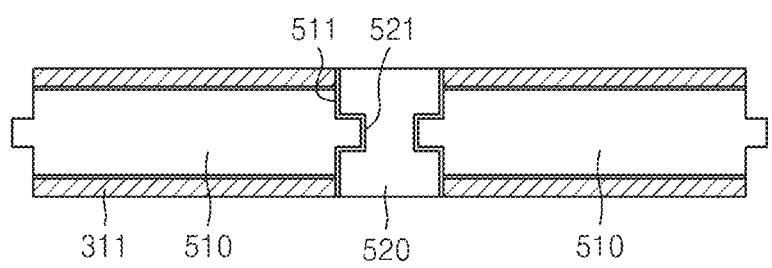
FIG. 8 is a cross-sectional view of an embodiment of a member that is input during an extrusion molding operation and is supported by a conveyor core.
Figure 9:
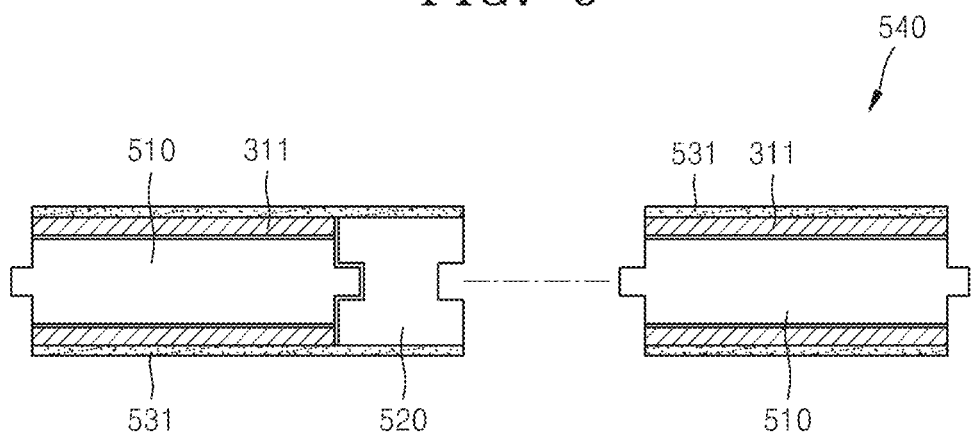
FIG. 9 is a cross-sectional view of an embodiment of an intermediate body in which a polymer layer is formed by an extrusion molding operation.
Figure 10:
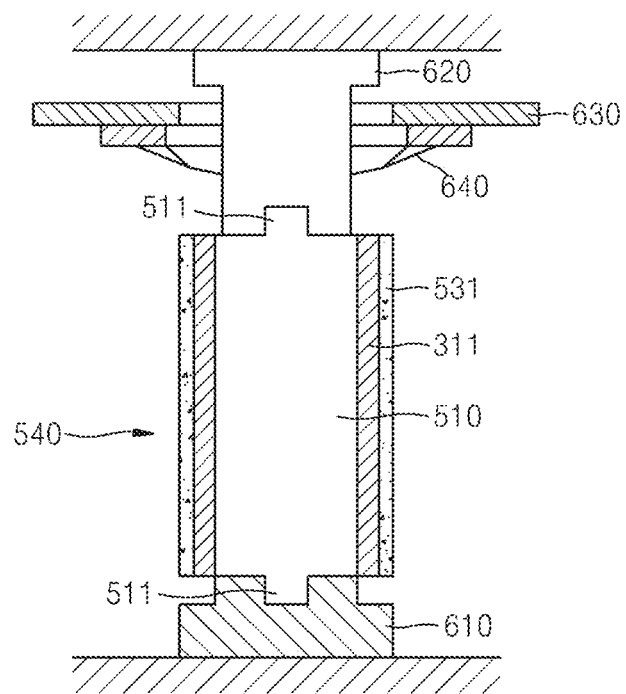
FIGS. 10 and 11 are views showing an embodiment of a ring blading operation according to the invention.
Figure 11:
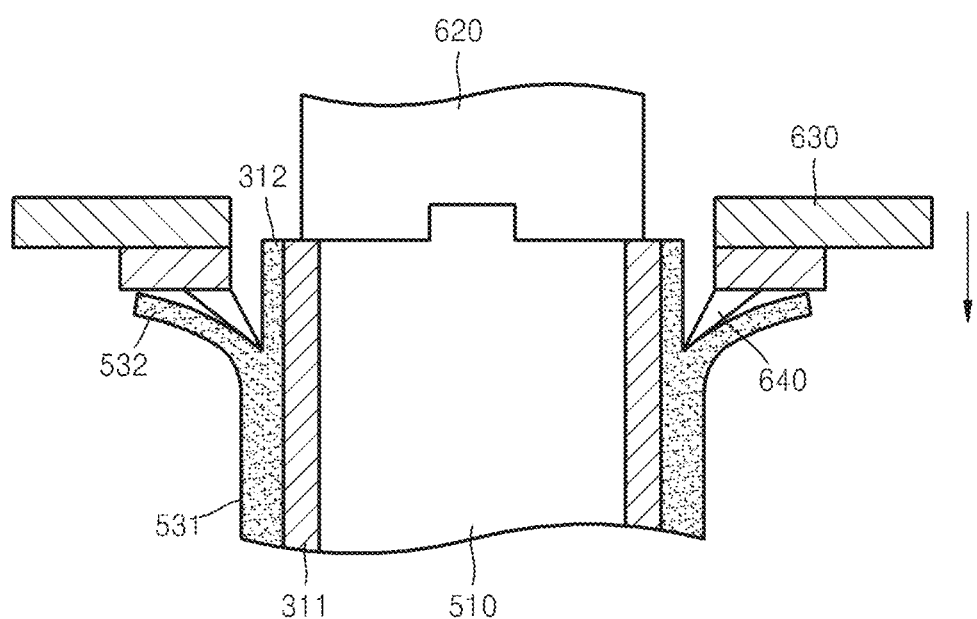

FIG. 7 is a schematic cross-sectional view of a molding die showing an embodiment of the extrusion molding operation 410 according to the invention, FIG. 8 is a cross-sectional view of an embodiment of a member that is input during the extrusion molding operation 410 and is supported by a conveyor core, FIG. 9 is a cross-sectional view of an embodiment of an intermediate body in which a polymer layer is formed by the extrusion molding operation, and FIGS. 10 and 11 are views showing an embodiment of a ring blading operation according to the invention.

In an embodiment, as shown in FIG. 7, the molding die 501 may include a feed hole 502, through which the member 311 passes, a supply hole 503, through which a polymer paste is supplied, and an outlet 504, from which the member 311 and the polymer paste come out. The polymer paste is supplied to the molding die 501 at a high pressure through the supply hole 503. The polymer paste passes through a transport path 505 in the molding die 501 to be transported to the outlet 504. The polymer paste meets an outer circumference of the member 311 that passes through the feed hole 502 in the vicinity of the outlet 504, and is attached onto the outer circumference of the member 311 to have a thickness corresponding to a diameter of the outlet 504.

In one embodiment, for example, where the member 311 is a metallic member having high rigidity, the member 311 as a whole may be input into the molding die 501 through the feed hole 502. In an alternative embodiment, where rigidity of the member 311 is substantially low, for example, where the member 311 is in a metallic or non-metallic thin tube form, the member 311 may be supported by a supplement member that supplements rigidity of the member 311 and be input into the molding die 501. In one embodiment, for example, as shown in FIG. 8, the member 311 may be inserted into a conveyor core 510 to be supplied to the molding die 501. In such an embodiment, the conveyor core 510 may be input into the member 311 having a cylindrical form. The conveyor core 510 may include a metallic or non-metallic material having high rigidity such that deformation of the member 311 is effectively prevented during the extrusion molding operation 410. An adaptor 520 may be disposed between a pair of conveyor cores 510 to provide a gap therebetween. In one embodiment, for example, first and second coupling portions 511 and 521 that are coupled with each other in a male-female coupling manner may be provided in the conveyor cores 510 and the adaptor 520, respectively. Although the adaptor 520 is shown as being spaced apart from the conveyor cores 510 at the front and the back in FIG. 8 for convenience of illustration, in an embodiment, the adaptor 520 and the conveyor cores 510 may substantially closely contact each other without any gap. In such an embodiment, the conveyor cores 510 may be closely inserted into the member 311 without any gap therebetween.

When the member 311, into which the conveyor core 510 is inserted, passes through the molding die 501, a polymer layer 531 is provided, e.g., formed, on an outer circumference of the member 311 using a polymer paste as illustrated in FIG. 9. The polymer layer 531 is provided on the outer circumference of the member 311 and on an outer circumference of the adaptor 520.

After the member 311 has passed through the molding die 501, the conveyor core 510 is separated from the adaptor 520. The polymer layer 531 here may be substantially soft as a hardening operation is not conducted yet, and thus the adaptor 520 and the conveyor core 510 are efficiently separated, e.g., cut, from each other. In one embodiment, for example, the polymer layer 531 between the adaptor 520 and the conveyor core 510 may be cut using a cutter to separate the conveyor core 510 from the adaptor 520. In such an embodiment, an intermediate body 540 includes the member 311, the outer circumference of which the polymer layer 531 is formed on, and the convey core 510 which is inserted into an inner circumference of the member 311. The polymer layer 531 is thicker than a final thickness, e.g., the predetermined thickness, of the resistive heating layer 321. The thickness of the polymer layer 531 may be adjusted while minimizing material loss considering a thickness thereof to be cut in a ring blading operation, which will hereinafter be described. In one embodiment, for example, when forming a thin film resistive heating layer 312 having a final thickness in a range of about 100 µm to about 500 µm, the polymer layer 531 may have a thickness of about 1 millimeter (mm) or less.

Next, in an embodiment, as shown in FIG. 6, the ring blading operation 420 is performed. Referring to FIG. 10, the intermediate body 540 is chucked in a ring blading apparatus. In one embodiment, for example, the first coupling portions 511 disposed on two sides of the conveyor core 510 may be fixed to upper and lower chucks 610 and 620, respectively. In such an embodiment, a ring blade 640 diverged outwardly is provided in a moving block 630. When chucking of the intermediate body 540 is completed, the ring blade 640 is clamped inwardly, and as illustrated in FIG. 11, the moving block 630 is moved downward, cutting the outer circumference of the polymer layer 531.

In such a manner, the resistive heating layer 312 having a uniform predetermined thickness may be provided, e.g., formed. In an embodiment of the ring blading operation 420, the resistive heating layer 312 having a circumferential thickness deviation of about 30 µm or less, an axial thickness deviation of about 30 µm or less, and a thickness of about 500 µm or less may be provided, e.g., formed.

After the extrusion molding operation 410, the polymer layer 531 is in a state in which chemical and physical coupling of polymers are substantially loose, and thus, the polymer layer 531 may be cut using the ring blade 640 substantially smoothly. The ring blading operation 420 does not include rotating of the intermediate body 540 or the ring blade 640, and thus, friction between the polymer layer 531 and the ring blade 640 may be relatively little compared to a grinding operation. Accordingly, in such an embodiment, heat generation in the ring blading operation 420 is effectively prevented or substantially reduced, and thus possibility of damage of conductive networks of electroconductive fillers is substantially lowered. The resistive heating layer 312 provided using the ring blading operation 420 is substantially smooth. In one embodiment, for example, the resistive heating layer 312 may have an average roughness (Ra) of about 1.0 µm and a mean roughness depth (Rz) of about 20 µm or less. In an embodiment, surface gloss of the resistive heating layer 312 is substantially high. In one embodiment, for example, the surface gloss of the resistive heating layer 312 may be about 5.0 gloss unit (GU) or more. In such an embodiment, a hardening operation is not performed before the ring blading operation 420 such that a cutting chip 532 that is cut during the ring blading operation 420 may be input to an extrusion molding operation after being blended with a new polymer paste. Thus, material loss is substantially reduced, thereby substantially reducing the material costs.

Next, the hardening operation 430 may be performed. The hardening operation 430 may include a first curing operation, in which chemical coupling of polymers of the resistive heating layer 312 are reinforced, and a second curing operation, in which volatile components in the resistive heating layer 312 are discharged. In one embodiment, the conditions of the hardening operation 430 may be selected based on types of polymers of the resistive heating layer 312. In one embodiment, for example, where the polymers of the resistive heating layer 312 is silicone rubbers, the first curing operation may be performed in the atmosphere of about 150° C. and for about 20 minutes, and the second curing operation may be performed in the atmosphere of about 220° C. and for about 4 hours.

As the hardening operation is performed, the resistive heating layer 312 that has a thickness of about 500 µm or less and a thickness deviation of about 30 µm or less in each of axial and circumferential directions may be provided. The thicker the resistive heating layer 312, the more the heat capacity thereof increases, and when the heat capacity of the resistive heating layer 312 is substantially great, the temperature of the resistive heating layer 312 may not be efficiently changed. According to an embodiment of the invention, the resistive heating layer 312 having a thickness of about 100 µm to about 500 µm may be provided such that the heat capacity of the resistive heating layer 312 is substantially reduced, and thus the temperature of the resistive heating layer 312 may be substantially rapidly changed.

During the fusing operation, toner on the recording medium P is fused, and thus an offset phenomenon, in which the toner is attached to the heating member 310, may occur. The offset may cause a printing failure such that some portions of a printing image on the recording medium P are missed, and cause a jam in which the recording medium P that is deviated from a fusing nip is not separated from the heating member 310 but attached onto a surface of the heating member 310. In an embodiment, where a material having sufficient releasability is used as a base polymer of the resistive heating layer 312, and when the above-described hardening operation is conducted, the manufacture of the heating member 310, in which the resistive heating layer 312 is included as an outermost layer, may be completed. In an alternative embodiment, the heating member 310 may include a release layer 314 on an outer circumference of the resistive heating layer 312 to provide sufficient releasability, as illustrated in FIG. 2. In an embodiment, the release layer 314 may include a polymer layer having substantially great releasability to effectively prevent attachment of toner to the heating member 310. In an embodiment, the release layer 314 may include a silicone polymer or a fluoropolymer. In such an embodiment, the fluoropolymer may include at least one of polyperfluoroethers, fluorinated polyethers, fluorinated polyimides, PEEK, fluorinated polyamides and fluorinated polyesters, for example. The release layer 314 may include at least one of the above-described polymers, or a blend or a copolymer of at least two polymers.

In an embodiment, when the release layer 314 is bonded to the resistive heating layer 312, a primer is applied between an outer surface of the resistive heating layer 312 and the release layer 314. In such an embodiment, the release layer 314 coated with a primer may be adhered to the outer surface of the resistive heating layer 312. The primer attaches a base polymer of the resistive heating layer 312 to the release layer 314 but does not attach an electroconductive filler to the release layer 314. When an operation of adjusting thickness uniformity is performed using a grinding operation after an extrusion molding operation, and if surface roughness of the resistive heating layer 312 is increased in the operation of the adjusting thickness uniformity, contact between the release layer 314 and the base polymer may not be sufficiently provided, and bonding intensity may be thereby reduced. When an electroconductive filler is exposed on the outer surface of the resistive heating layer 312 or a grinded electroconductive filler is attached to the roughened outer surface of the resistive heating layer 312 in the grinding operation, a contact area between the release layer 314 and the base polymer may be further reduced due to the electroconductive filler, and the bonding rigidity may be thereby substantially lowered. When the resistive heating layer 312 and the release layer 314 do not form a smooth bonding interface, a pin hole may be formed in the interface between the resistive heating layer 312 and the release layer 314. The pin hole may cause a drop in a withstand voltage and may even cause damage of the release layer 314.

According to an embodiment of the invention, in which a ring blading operation is performed instead of a grinding operation, a thin film resistive heating layer 312 having a substantially low mean roughness depth (Rz) of about 20 μm or less and a substantially high surface gloss of about 5.0 GU or more may be provided. In such an embodiment, a smooth bonding interface between the resistive heating layer 312 and the release layer 314 are provided such that generation of pin holes and damage possibility of the release layer 314, which is caused by a drop in a withstand voltage due to the pin holes, are effectively prevented or substantially reduced. In a grinding operation, processing is typically performed in a direction substantially perpendicular to an extrusion direction (e.g., a thickness direction of the resistive heating layer 312). In an embodiment, processing in the ring blading operation is performed in the same direction as the extruding direction, and thus damage of conductive networks provided in the resistive heating layer 312 is effectively minimized. When comparing resistance variations in the resistive heating layer 312 before and after a grinding operation and before and after a ring blading operation, resistance variation before and after a grinding operation is greater than resistance variation before and after a ring blading operation.

Figure 12:
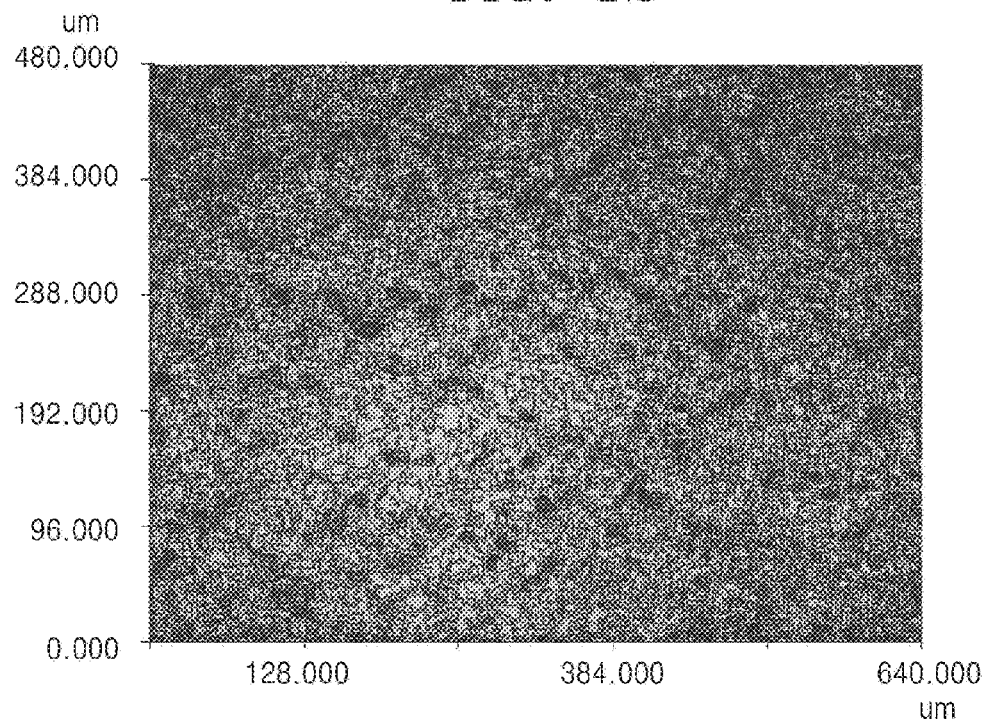
FIG. 12 is an optical microscopic image of a surface of an embodiment of a thin film resistive heating layer formed using the ring blading operation.
Figure 13:
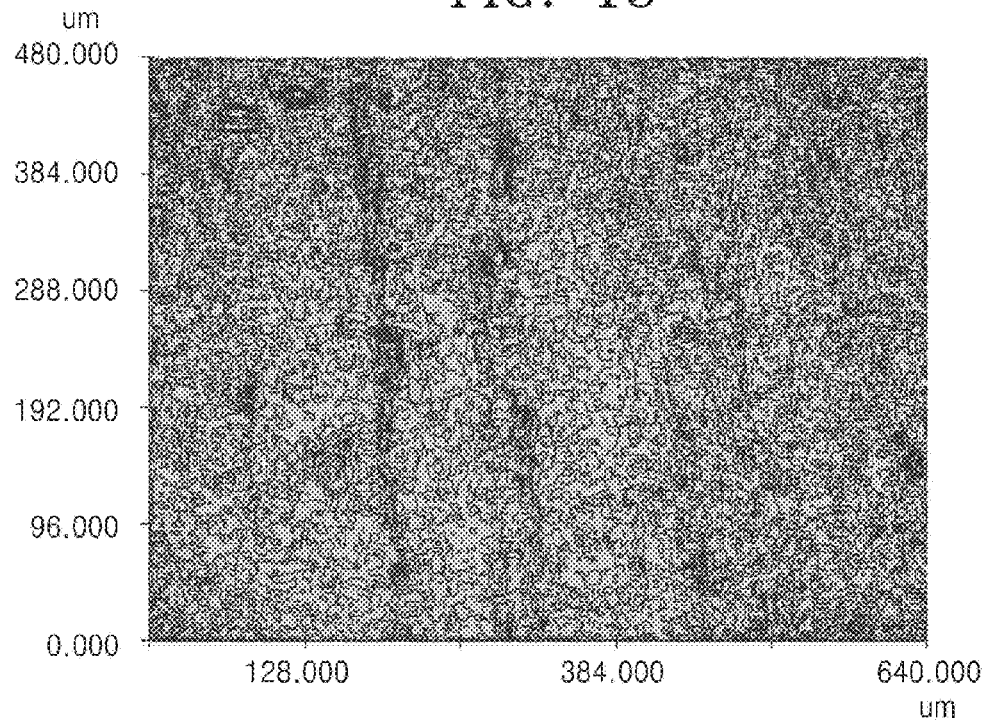
FIG. 13 is an optical microscopic image of a surface of an embodiment of a thin film resistive heating layer manufactured using a grinding operation.

Exemplary Embodiment
  Member: polyimide, Thickness: about 50 μm, Inner Diameter: about 24 mm, Length: about 247 mm
  Polymer paste: silicone base polymer, carbon nanotubes about 13 parts by weight, Viscosity: 1,160 Pa·s, at about 100/s
  Polymer layer (531): extrusion molding operation, Thickness: about 700 μm
  Thickness deviation in a circular direction: <about 200 μm, Thickness deviation in an axial direction: <about 100 μm
  Resistive heating layer 312: Ring blading operation, thickness about 300 μm
  Thickness deviation in a circumferential direction: <about 25 μm, Thickness deviation in an axial direction: <about 10 μm
  Resistance of the resistive heating layer 312: about 28.1 ohms (Ω)
  Surface gloss of the resistive heating layer 312: about 5.1 GU-about 7.1 GU
  Surface roughness of the resistive heating layer 312: Ra=about 1.17 μm, Rz=about 17.50 μm
Comparative Embodiment
  Member: identical
  Polymer paste: identical
  Polymer layer 531: identical
  Resistive heating layer 312: Grinding operation, Thickness: about 300 μm
  Thickness deviation in a circumferential direction: <about 30 μm, Thickness deviation in an axial direction: <about 10 μm
  Resistance of the resistive heating layer 312: about 41.4 Ω
  Surface gloss of the resistive heating layer 312: about 1.0 GU-about 1.3 GU
  Surface roughness of the resistive heating layer 312: Ra=about 1.86 μm, Rz=about 41.12 μm The embodiment of the heating member 310 described above is provided using an extrusion molding operation and a ring blading operation. The comparative embodiment of the heating member is provided using an extrusion molding operation and a grinding operation. FIG. 12 is an optical microscopic image of a surface of an embodiment of a thin film resistive heating layer according to the invention, and FIG. 13 is an optical microscopic image of a surface of the comparative embodiment of a thin film resistive heating layer.

As described above, the embodiment of a thin film resistive heating layer provided using the ring blading operation has lower resistance, higher surface gloss and lower surface roughness. Surface gloss was measured using GlossTector by SaluTron at an angle of light incidence of 85 degrees, and upper and lower limits of ten measurements are as described above. Surface roughness was measured using OLS300 by Olympus®, and roughness values of ten lines of the optical images of surfaces of FIGS. 12 and 13 were measured and an arithmetic mean thereof was calculated.

The comparative embodiment of the thin film resistive heating layer provided using a grinding operation exhibits about 46% more resistance than the embodiment of the thin film resistive heating layer provided using a ring blading operation. In an embodiment, when the film resistive heating layer is provided, an extruding direction and a ring blading direction are the same, and while a grinding operation is performed after a hardening operation, a ring blading operation on the other hand is performed before a hardening operation such that a portion of the polymer layer 531 is removed before curing, and thus, orientation of carbon nanotubes in the polymer layer 531 during extrusion molding is less affected, and the conductive networks in the polymer layer 531 are thereby substantially maintained. The mean roughness depth (Rz) of the resistive heating layer 312 provided using a grinding operation may be about twice the surface roughness of the resistive heating layer provided the ring blading operation. In such an embodiment, the ring blading operation is performed before curing such that the high surface gloss and the low surface roughness are obtained. In a grinding operation, surface roughness of a CNT/polymer layer may be substantially proportional to surface roughness of a grinding stone. As shown in FIG. 13, when a grinding operation is applied, deep recesses are formed in a processing direction, and the deep recesses increase surface roughness. When a grinding operation is applied, surface roughness of the resistive heating layer may be increased by sequentially varying surface roughness of a grinding stone, damage to conductive networks may be substantially higher compared to the embodiment using a ring blading operation.

Figure 14:
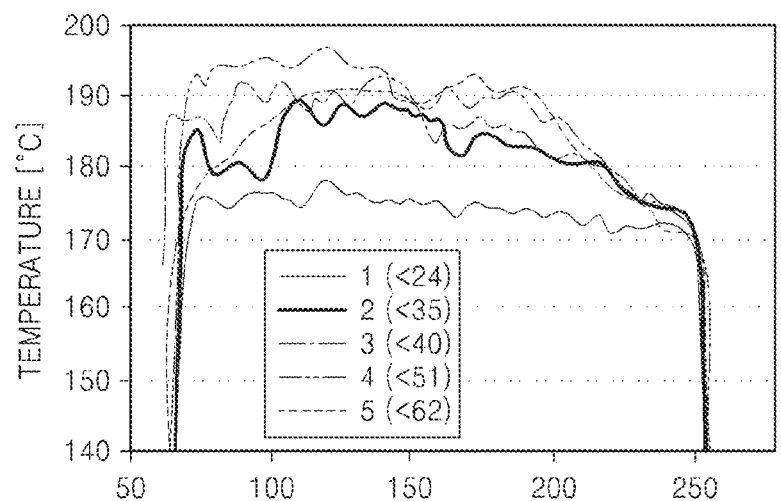
FIG. 14 is a graph showing a relationship between thickness uniformity of a thin film resistive heating layer and a fusing temperature uniformity of the thin film resistive heating layer in an axial direction.
Figure 15:
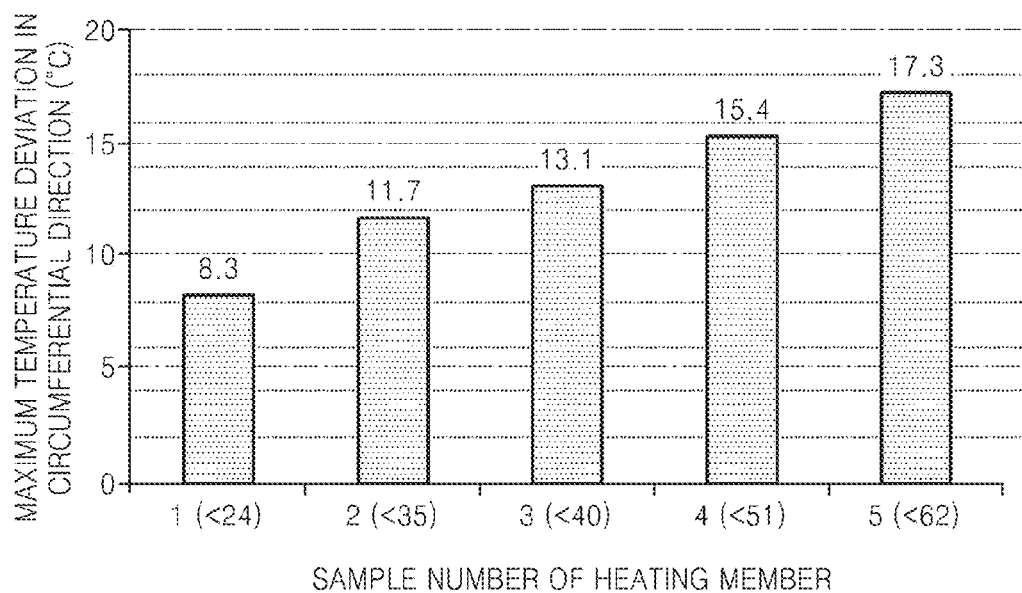
FIG. 15 is a graph showing a relationship between thickness uniformity of a thin film resistive heating layer and a fusing temperature uniformity of the thin film resistive heating layer in a circumferential direction.

FIG. 14 is a graph showing a relationship between thickness uniformity of a thin film resistive heating layer and a fusing temperature uniformity of the thin film resistive heating layer in an axial direction, and FIG. 15 is a graph showing a relationship between thickness uniformity of a thin film resistive heating layer and a fusing temperature uniformity of the thin film resistive heating layer in a circumferential direction.

An embodiment of the heating member 310 including the embodiment of the resistive heating layer 312 described above was provided using the extrusion molding operation 410, the ring blading operation 420, and the hardening operation 430, and a release layer 314 including PFA and having a thickness of about 30 μm was provided on an outer circumference of the resistive heating layer 312. The resistive heating layer 312 was provided to have a thickness uniformity of about 24 μm, about 35 μm, about 40 μm, about 51 μm, and about 62 μm in axial and circumferential directions. The thickness uniformity (e.g., the thickness deviation) may be defined by a thickness deviation of the resistive heating layer 312 with respect to the predetermined thickness of the resistive heating layer 312. To supply a current, a nickel electrode having a thickness of about 45 μm and a length of about 15.5 mm were provided at two ends of the resistive heating layer 312 in an axial direction.

In an embodiment, heating uniformity in axial and circumferential directions, that is, a difference in the highest and lowest temperatures in axial and circumferential directions, may be about 10° C. or less such that uniform fusion properties are provided over substantially the entire region of the heating member 310 in an axial direction in a fusing unit. A result of testing temperature uniformity of the heating member 310 in the axial direction by applying a current to the heating member 310 manufactured by an embodiment of the method described above is illustrated in FIG. 14. Referring to FIG. 14, when thickness uniformity was about 24 μm, a temperature difference in the axial direction of the heating member 310 was about 10° C., but when the thickness uniformity exceeded about 30 μm, the temperature difference in the axial direction was higher than 10° C. FIG. 15 shows a result of testing temperature uniformity of the heating member 310 in a circumferential direction. Referring to FIG. 15, a temperature difference of the heating member 310 in a circumferential direction was about 8.3° C. when thickness uniformity was about 24 μm, but as the thickness uniformity exceeded about 30 μm, the temperature difference of the heating member 310 in the circumferential direction was also higher than 10° C.

Referring back to FIG. 2, in an embodiment, an intermediate layer 313 is further provided between the resistive heating layer 312 and the release layer 314. An adhesive force between polymers that are the same kind is greater than that between polymers that are of different kinds. In an embodiment, the intermediate layer 313 may include polymers that are the same kind as the polymers of the resistive heating layer 312 such that the adhesive force between the intermediate layer 313 and the resistive heating layer 312 is substantially increased. The intermediate layer 313 may be a polymer layer including at least one of a silicone polymer and a fluoropolymer, or a blend or a copolymer of the above polymers. In such an embodiment, the fluoropolymer include polyperfluoroethers, fluorinated polyethers, fluorinated polyimides, fluorinated PEEK, fluorinated polyamides and fluorinated polyesters, for example.

In an embodiment, the intermediate layer 313 may be a substantially electrically non-conductive layer. In such an embodiment, the intermediate layer 313 may not include an electroconductive filler. In an alternative embodiment, a small amount of an electroconductive filler may be included in the intermediate layer 313 during the manufacturing process. In one embodiment, the content of the electroconductive filler may be about 5 parts by weight or less, for example.

In one embodiment, for example, before hardening of the resistive heating layer 312, the intermediate layer 313 may be provided on an outer surface of the resistive heating layer 312, and then the resistive heating layer 312 and the intermediate layer 313 may be hardened together, thereby further increasing adhesive intensity. When forming the intermediate layer 313, the resistive heating layer 312 may be semi-hardened and then the intermediate layer 313 may be formed such that damage of the resistive heating layer 312 is effectively prevented. In such embodiments, the adhesive intensity between the resistive heating layer 312 and the intermediate layer 313 are substantially improved.

Next, the release layer 314 coated with a primer may be bonded to the outer surface of the intermediate layer 313. In an embodiment, the intermediate layer 313 may not include electrical conductive filler or include substantially small amount of electrical conductive filler such that an interface between the intermediate layer 313 and the release layer 314 is substantially smooth and has a high adhesive intensity. Accordingly, in such embodiment, the adhesive intensity between the intermediate layer 313 and the release layer 314 is substantially improved.

In an embodiment, the intermediate layer 313 is a polymer that is elastic, and the intermediate layer 313 may function as an elastic layer together with the resistive heating layer 312. In such an embodiment, a fusing nip is effectively formed to thereby increase fusing properties, and fatigue of the resistive heating layer 312 due to repeated use may be lowered to thereby increase durability of the heating member 310.

The intermediate layer 313 itself may increase a withstand voltage of the heating member 310. A withstand voltage increases substantially proportional to a thickness of a current blocking material, and the thickness of a current blocking material may be increased by providing the intermediate layer 313, which is electrically non-conductive.

The intermediate layer 313, which is electrically non-conductive, may block a leakage current. The intermediate layer 313 may block a leakage current by blocking outward growth of pin holes in the interface between the resistive heating layer 312 and the intermediate layer 313. When the release layer 314 is damaged by repeated use, the resistive heating layer 312 is effectively prevented from being exposed to the outside by the intermediate layer 313, which is electrically non-conductive surrounds the resistive heating layer 312. Accordingly, in such an embodiment, an electrical shock due to a leakage current is effectively prevented.

The intermediate layer 313 may include a polymer having resistance to flame of the degree V2 or higher according to UL94 standards. In an embodiment, the intermediate layer 313 that is resistant to flame is provided to surround the resistive heating layer 312, and the intermediate layer 313 thereby supports the overall fusing unit 300 to be flame resistant.

In an embodiment, the intermediate layer 313 includes polymers that are the same kind as the polymers of the resistive heating layer 312, as described above, but the invention is not limited thereto. In an alternative embodiment, the intermediate layer 313 may include polymers that are the same kind as the polymers of the release layer 314. In such an embodiment, an interface having a high adhesive intensity may be provided between the intermediate layer 313 and the release layer 314, and the intermediate layer 313 functions as an elastic layer together with the resistive heating layer 312, thereby substantially lowering fatigue that is accumulated in the resistive heating layer 312 due to repeated use. In such an embodiment, where the intermediate layer 313 is interposed between the resistive heating layer 312 and the release layer 314, outward growth of pin holes in the interface between the resistive heating layer 312 and the intermediate layer 313 is effectively prevented, thereby effectively preventing damage of the release layer 314 and leakage current due to such damage.

While the heating member applied to a fusing unit of an electro-photographic image forming apparatus has been described above, the range of application of the heating member is not limited to a fusing unit, and the heating member may also be applied to various kinds of devices that include a heat source that generates heat using electricity.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A method of forming thin film resistive heating layer, the method comprising:
   providing a polymer layer by extruding a polymer paste, in which an electroconductive filler is dispersed, using an extrusion molding operation on an outer circumferential surface of a cylindrical member; and
   providing a thin film resistive heating layer using a ring blading operation such that an outer diameter of the polymer layer is substantially uniform.

2. The method of claim 1, wherein the thin film resistive heating layer has a thickness in a range of about 100 micrometers to about 500 micrometers.

3. The method of claim 2, wherein the polymer layer has a thickness of about 1 millimeter or less.

4. The method of claim 2, wherein a thickness deviation of the thin film resistive heating layer in a circumferential direction is about 30 micrometers or less.

5. The method of claim 2, wherein a thickness deviation of the thin film resistive heating layer in an axial direction is about 30 micrometers or less.

6. The method of claim 2, wherein viscosity of the polymer paste at a shear rate of 100 inverse seconds is about 500 Pascal second or more.

7. The method of claim 2, wherein electrical conductivity of the thin film resistive heating layer is about 100 siemens per meter or higher.

8. The method of claim 1, wherein the electroconductive filler includes carbon nanotubes of about 5 parts by weight or more.

9. The method of claim 8, wherein a length of the carbon nanotubes are about 1 micrometer or more.

10. The method of claim 1, wherein mean roughness depth of the thin film resistive heating layer is about 20 micrometers or less.

11. The method of claim 1, wherein surface gloss of the thin film resistive heating layer is about 5.0 gloss unit or more.

12. The method of claim 1, further comprising:
    Hardening the thin film resistive heating layer.

13. A heating member comprising:
    a cylindrical member; and
    a thin film resistive heating layer which is formed on an outer circumferential surface of the cylindrical member according to the method of claim 1.

14. The heating member of claim 13, wherein the electroconductive filler comprises carbon nanotubes of about 5 parts by weight or more, and wherein a length of the carbon nanotubes are 1 micrometers or more.

15. A fusing unit comprising:
    the heating member of claim 13; and
    a pressurizing member disposed opposite to the heating member, wherein the heating member and the pressurizing member define a fusing nip which pressurizes and transports a recording medium.

16. The heating member of claim 13, wherein the thin film resistive heating layer has a thickness in a range of about 100 micrometers to about 500 micrometers.

17. The heating member of claim 16, wherein mean roughness depth of the thin film resistive heating layer is about 20 micrometers or less.

18. The heating member of claim 16, wherein surface gloss of the thin film resistive heating layer is about 5.0 gloss unit or more.

19. The heating member of claim 16, wherein a thickness deviation of the thin film resistive heating layer in a circumferential direction is about 30 micrometers or less.

20. The heating member of claim 16, wherein a thickness deviation of the thin film resistive heating layer in an axial direction is about 30 micrometers or less.

* * * * *